Figure 1:
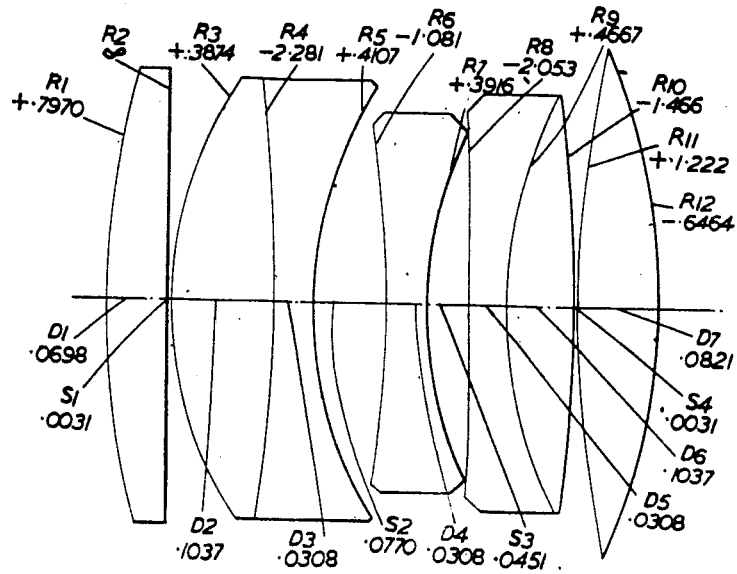

May 9, 1944.  A. WARMISHAM  2,348,667
OPTICAL OBJECTIVE
Filed March 23, 1943

INVENTOR.
A. WARMISHAM

Patented May 9, 1944

2,348,667

UNITED STATES PATENT OFFICE 2,348,667

OPTICAL OBJECTIVE

Arthur Warmisham, Leicester, England, assignor to Taylor, Taylor & Hobson Limited, Leicester, England, a company of Great Britain Application March 23, 1943, Serial No. 480,203
In Great Britain March 30, 1942

20 Claims. (Cl. 88—57)

This invention relates to an optical objective for photographic or other purposes, corrected for spherical and chromatic aberrations, coma, astigmatism, field curvature and distortion. One well-known type of objective of this kind comprises two compound divergent meniscus components with their concave air-exposed surfaces facing one another and located between two outer simple convergent components. With such objectives a high degree of correction for the aberrations can be obtained with relatively high aperture, but even in the best objectives of this type there is usually a considerable residual overcorrection for oblique spherical aberration.

The present invention has for its object to provide a modified form of objective of this known type wherein good correction is provided for oblique spherical aberration as well as for the other aberrations.

To this end according to the invention an additional divergent component is provided between the two inner compound components, so as to enable the dispersive power normally provided by the air exposed concave surfaces of the two compound meniscus components, to be distributed amongst four surfaces.

Thus the objective according to the invention comprises five components in axial alignment, of which the first and fifth are simple convergent components, the second and fourth are compound components each consisting of a convergent element cemented to a divergent element, and the third is a simple divergent component, the difference between the curvatures of the rear surface of the third component and of the front surface of the fourth component (such difference being measured algebraically taking into account the signs of the curvatures in accordance with the usual convention) being greater than twice and less than four times the reciprocal of the equivalent focal length of the whole objective. The compound second component is preferably of meniscus form with its air-exposed surfaces convex to the front, whilst the fourth component may either be of meniscus form with its air-exposed surfaces concave to the front or may have its front surface plane or slightly convex to the front.

Usually the rear surface of the third component will be convex to the front and more strongly curved than the front surface of the fourth component, so that the air space between these surfaces has the form of a convergent lens. It is to be understood that the terms "front" and "rear" as herein used relate to the sides of the objective respectively nearer to and further from the longer conjugate in accordance with the usual convention.

The materials of which the four convergent elements of the objective are made preferably all have relatively high means refractive indices, for example between 1.62 and 1.66.

The mean refractive index of the material used for the convergent elements of the second component preferably exceeds that for the divergent element cemented to it by less than .08. In a similar manner the mean refractive index of the material used for the convergent element of the fourth component preferably exceeds that for the divergent element cemented to it by more than .08. In general, the index difference in the fourth component will usually be of the order of twice that in the second component.

In order that a high relative aperture can be achieved for the objective it will usually be desirable for the mean refractive index of the material used for the simple third component to be greater than 1.65.

Figure 2:
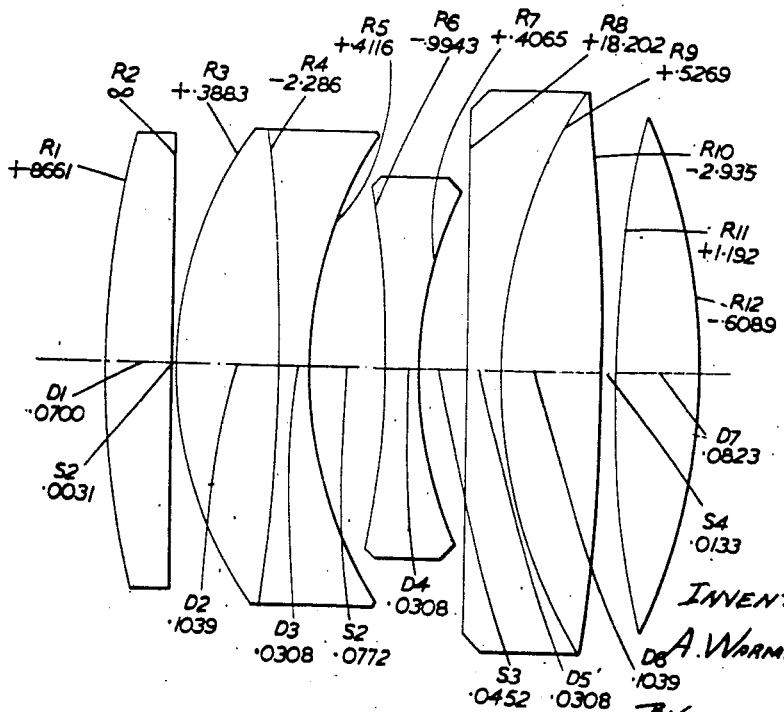

In the accompanying drawing,

Figures 1 and 2 respectively show two convenient practical examples of objective according to the invention.

Numerical data for these two examples are given in the following tables, in which $R_1, R_2 \ldots$ designate the radii of curvature of the individual surfaces counting from the front (the positive sign indicating that the surface is convex to the front and the negative that it is concave thereto), $D_1, D_2 \ldots$ designate the axial thicknesses of the individual element, and $S_1, S_2 \ldots$ designate the axial air spaces between the components. The tables also give the mean refractive index for the D-line and the Abbé $\nu$ number for the glasses of which the various elements are made.

*Example I*

| Equivalent focal length 1.000 | | Relative aperture F/2 | |
|---|---|---|---|
| Radius | Thickness or air separation | Refractive index $n_D$ | Abbé $\nu$ number |
| $R_1=+.7970$ | | | |
| | $D_1=.0698$ | 1.644 | 48.3 |
| $R_2=\infty$ | | | |
| | $S_1=.0031$ | | |
| $R_3=+.3874$ | | | |
| | $D_2=.1037$ | 1.644 | 48.3 |
| $R_4=-2.281$ | | | |
| | $D_3=.0308$ | 1.579 | 41.2 |
| $R_5=+.4107$ | | | |
| | $S_2=.0770$ | | |
| $R_6=-1.081$ | | | |
| | $D_4=.0308$ | 1.749 | 27.8 |
| $R_7=+.3916$ | | | |
| | $S_3=.0451$ | | |
| $R_8=-2.053$ | | | |
| | $D_5=.0308$ | 1.529 | 51.6 |
| $R_9=+.4667$ | | | |
| | $D_6=.1037$ | 1.644 | 48.3 |
| $R_{10}=-1.466$ | | | |
| | $S_4=.0031$ | | |
| $R_{11}=+1.222$ | | | |
| | $D_7=.0821$ | 1.644 | 48.3 |
| $R_{12}=-.6464$ | | | |

*Example II*

| Equivalent focal length 1.000 | | Relative aperture F/2 | |
|---|---|---|---|
| Radius | Thickness or air separation | Refractive index $n_D$ | Abbé $\nu$ number |
| $R_1=+.8661$ | | | |
| | $D_1=.0700$ | 1.644 | 48.3 |
| $R_2=\infty$ | | | |
| | $S_1=.0031$ | | |
| $R_3=+.3883$ | | | |
| | $D_2=.1039$ | 1.644 | 48.3 |
| $R_4=-2.286$ | | | |
| | $D_3=.0308$ | 1.579 | 41.2 |
| $R_5=+.4116$ | | | |
| | $S_2=.0772$ | | |
| $R_6=-.9943$ | | | |
| | $D_4=.0308$ | 1.749 | 27.8 |
| $R_7=+.4065$ | | | |
| | $S_3=.0452$ | | |
| $R_8=+18.202$ | | | |
| | $D_5=.0308$ | 1.529 | 51.6 |
| $R_9=+.5269$ | | | |
| | $D_6=.1039$ | 1.644 | 48.3 |
| $R_{10}=-2.935$ | | | |
| | $S_4=.0133$ | | |
| $R_{11}=+1.192$ | | | |
| | $D_7=.0823$ | 1.644 | 48.3 |
| $R_{12}=-.6089$ | | | |

In both examples the compound second component is of meniscus form with both its surfaces strongly curved, but the examples differ in respect of the form of the compound fourth component. Thus in the first example the four component is of meniscus form but with its front surface much more weakly curved than the rear surface of the second component, whilst in the second example the front surface of the fourth component is slightly convex to the front, so that this component is biconvex.

In both examples the algebraic difference between the curvatures of the seventh and eighth surfaces is approximately three times the reciprocal of the equivalent focal length of the objective. The difference of mean refractive indices across the cemented surfaces $R_4$ of the second component amounts to .065 and is somewhat greater than half the corresponding index difference across the cemented surface $R_9$ in the fourth component, such difference amounting to .115.

These examples give good correction for oblique spherical abberation, and in fact what is believed to be the highest degree of correction for this aberration ever yet obtained, at the aperture F/2. Thus in contrast with the known four-component objectives, from which the objective according to the invention has been developed, the oblique spherical aberration; instead of being strongly over-corrected, is in fact slightly under-corrected in these examples.

What I claim as my invention and desire to secure by Letters Patent is:

1. An optical objective for photographic or other purposes, corrected for spherical and chromatic aberrations, coma, astigmatism, field curvature and distortion, and comprising five components in axial alignment, of which the first and fifth are simple convergent components, the second and fourth are compound components each consisting of a convergent element cemented to a divergent element, and the third is a simple divergent component, the difference (measured algebraically) between the curvatures of the rear surface of the third component and of the front surface of the fourth component being greater than twice and less than four times the reciprocal of the equivalent focal length of the whole objective.

2. An optical objective as claimed in claim 1, in which the compound second component is of meniscus form with its air-exposed surfaces convex to the front.

3. An optical objective as claimed in claim 1, in which the rear surface of the third component is convex to the front and is more strongly curved than the front surface of the fourth component.

4. An optical objective as claimed in claim 1, in which the compound second component is of meniscus form with its air-exposed surfaces convex to the front, and the rear surface of the third component is convex to the front and is more strongly curved than the front surface of the fourth component.

5. An optical objective for photographic or other purposes, corrected for spherical and chromatic aberrations, coma, astigmatism, field curvature and distortion, and comprising five components in axial alignment, of which the first and fifth are simple convergent components, the second and fourth are compound components each consisting of a convergent element cemented to a divergent element, and the third is a simple divergent component, the difference (measured algebraically) between the curvatures of the rear surface of the third component and of the front surface of the fourth component being greater than twice and less than four times the reciprocal of the equivalent focal length of the whole objective, whilst the materials of which the four convergent elements of the objective are made all have mean refractive indices lying between 1.62 and 1.66.

6. An optical objective as claimed in claim 1, in which the compound second component is of meniscus form with its air-exposed surfaces convex to the front, and the rear surface of the third component is convex to the front and is more strongly curved than the front surface of the fourth component, whilst the materials of which the four convergent elements of the objective are made all have mean refractive indices lying between 1.62 and 1.66.

7. An optical objective as claimed in claim 1, in which the mean refractive index of the material used for the convergent element of the second component exceeds that of the divergent element cemented to it by less than .08.

8. An optical objective as claimed in claim 1, in which the compound second component is of meniscus form with its air-exposed surfaces convex to the front and the mean refractive index of the material used for the convergent element of such component exceeds that for the divergent element cemented to it by less than .08.

9. An optical objective as claimed in claim 5 in which the mean refractive index of the material used for the convergent element of the second component exceeds that for the divergent element cemented to it by less than .08.

10. An optical objective as claimed in claim 1, in which the mean refractive index of the material used for the convergent element of the fourth component exceeds that for the divergent element cemented to it by more than .08.

11. An optical objective as claimed in claim 1, in which the rear surface of the third component is convex to the front and is more strongly curved than the front surface of the fourth component and the mean refractive index of the material used for the convergent element of the fourth component exceeds that for the divergent element cemented to it by more than .08.

12. An optical objective as claimed in claim 5, in which the mean refractive index of the material used for the convergent element of the fourth component exceeds that for the divergent element cemented to it by more than .08.

13. An optical objective as claimed in claim 1, in which the mean refractive index of the material used for the convergent element of the second component exceeds that of the divergent element cemented to it by less than .08 and the corresponding index difference in the fourth component is greater than .08.

14. An optical objective as claimed in claim 1, in which the mean refractive index of the material used for the simple third component is greater than 1.65.

15. An optical objective as claimed in claim 1, in which the rear surface of the third component is convex to the front and is more strongly curved than the front surface of the fourth component and the mean refractive index of the material used for the simple third component is greater than 1.65.

16. An optical objective as claimed in claim 5, in which the mean refractive index of the material used for the simple third component is greater than 1.65.

17. An optical objective as claimed in claim 1, in which the mean refractive index of the material used for the convergent element of the fourth component exceeds that for the divergent element cemented to it by more than .08 and the mean refractive index of the material used for the simple third component is greater than 1.65.

18. An optical objective as claimed in claim 1, in which the mean refractive index of the material used for the convergent element of the second component exceeds that of the divergent element cemented to it by less than .08 and the corresponding index difference in the fourth component is greater than .08 whilst the mean refractive index of the material used for the simple third component is greater than 1.65.

19. An optical objective having numerical data substantially as set forth in the following table, wherein R designates the radius of curvature of the individual surfaces, D designates the axial thickness of the individual elements and S designates the axial air space between the components:

| Equivalent focal length 1.000 | | Relative aperture F/2 | |
|---|---|---|---|
| Radius | Thickness or air separation | Refractive index $n_D$ | Abbé $\nu$ number |
| $R_1 = +.7970$ | $D_1 = .0698$ | 1.644 | 48.3 |
| $R_2 = \infty$ | $S_1 = .0031$ | | |
| $R_3 = +.3874$ | $D_2 = .1037$ | 1.644 | 48.3 |
| $R_4 = -2.281$ | $D_3 = .0308$ | 1.579 | 41.2 |
| $R_5 = +.4107$ | $S_2 = .0770$ | | |
| $R_6 = -1.081$ | $D_4 = .0308$ | 1.749 | 27.8 |
| $R_7 = +.3916$ | $S_3 = .0451$ | | |
| $R_8 = -2.053$ | $D_5 = .0308$ | 1.529 | 51.6 |
| $R_9 = +.4667$ | $D_6 = .1037$ | 1.644 | 48.3 |
| $R_{10} = -1.466$ | $S_4 = .0031$ | | |
| $R_{11} = +1.222$ | $D_7 = .0821$ | 1.644 | 48.3 |
| $R_{12} = -.6464$ | | | |

20. An optical objective having numerical data substantially as set forth in the following table, wherein R designates the radius of curvature of the individual surfaces, D designates the axial thickness of the individual elements and S designates the axial air space between the components:

| Equivalent focal length 1.000 | | Relative aperture F/2 | |
|---|---|---|---|
| Radius | Thickness or air separation | Refractive index $n_D$ | Abbé $\nu$ number |
| $R_1 = +.8661$ | $D_1 = .0700$ | 1.644 | 48.3 |
| $R_2 = \infty$ | $S_1 = .0031$ | | |
| $R_3 = +.3883$ | $D_2 = .1039$ | 1.644 | 48.3 |
| $R_4 = -2.286$ | $D_3 = .0308$ | 1.579 | 41.2 |
| $R_5 = +.4116$ | $S_2 = .0772$ | | |
| $R_6 = -.9943$ | $D_4 = .0308$ | 1.749 | 27.8 |
| $R_7 = +.4065$ | $S_3 = .0452$ | | |
| $R_8 = +18.202$ | $D_5 = .0308$ | 1.529 | 51.6 |
| $R_9 = +.5269$ | $D_6 = .1039$ | 1.644 | 48.3 |
| $R_{10} = -2.935$ | $S_4 = .0133$ | | |
| $R_{11} = +1.192$ | $D_7 = .0823$ | 1.644 | 48.3 |
| $R_{12} = -.6089$ | | | |

ARTHUR WARMISHAM.